United States Patent
Yaman et al.

(10) Patent No.: US 10,401,564 B2
(45) Date of Patent: Sep. 3, 2019

(54) FIBER NONLINEARITY MITIGATION USING STRONG MODE COUPLING AND LARGE MODAL DELAY

(71) Applicant: NEC Laboratories America, Inc., Princeton, NJ (US)

(72) Inventors: Fatih Yaman, Princeton, NJ (US); Shaoliang Zhang, Princeton, NJ (US); Eduardo Mateo Rodriguez, Tokyo (JP); Takanori Inoue, Tokyo (JP); Kohei Nakamura, Tokyo (JP); Yoshihisa Inada, Tokyo (JP); Takaaki Ogata, Tokyo (JP)

(73) Assignee: NEC CORPORATION (JP)

( * ) Notice: Subject to any disclaimer, the term of this patent is extended or adjusted under 35 U.S.C. 154(b) by 0 days.

(21) Appl. No.: 16/155,787

(22) Filed: Oct. 9, 2018

(65) Prior Publication Data

US 2019/0107671 A1    Apr. 11, 2019

Related U.S. Application Data

(60) Provisional application No. 62/569,715, filed on Oct. 9, 2017.

(51) Int. Cl.
*G02B 6/02* (2006.01)
*G02B 6/036* (2006.01)
*H04B 10/2569* (2013.01)
*G02B 6/38* (2006.01)

(52) U.S. Cl.
CPC .......... *G02B 6/036* (2013.01); *G02B 6/3885* (2013.01); *H04B 10/2569* (2013.01)

(58) Field of Classification Search
CPC ... G02B 6/036; G02B 6/3885; H04B 10/2569
See application file for complete search history.

(56) References Cited

U.S. PATENT DOCUMENTS

| | | | |
|---|---|---|---|
| 7,362,977 B2 * | 4/2008 | Moeller | H04B 10/2513 398/147 |
| 2013/0039627 A1 * | 2/2013 | Li | G02B 6/02042 385/126 |
| 2014/0093205 A1 * | 4/2014 | Gruner-Nielsen | G02B 6/0288 385/43 |
| 2014/0161404 A1 * | 6/2014 | Fini | G02B 6/0288 385/126 |
| 2014/0205300 A1 * | 7/2014 | Hemenway, Jr. | H04B 10/2581 398/116 |

* cited by examiner

*Primary Examiner* — Eric Wong
(74) *Attorney, Agent, or Firm* — Joseph Kolodka

(57) ABSTRACT

Aspects of the present disclosure describe fiber nonlinearity induced transmission penalties are reduced both in fibers with large polarization-mode dispersion, and in coupled-core multicore fibers (CC-MCF). In the case of coupled multi-core fibers, the requirement for modal delay is less.

2 Claims, 5 Drawing Sheets

FIBER NONLINEARITY MITIGATION USING STRONG MODE COUPLING AND LARGE MODAL DELAY

CROSS REFERENCE TO RELATED APPLICATION

This application claims the benefit of United States Provisional Patent Application Ser. No. 62/569,715 filed 9 Oct. 2017 the entire content of which is incorporated by reference as if set forth at length herein.

TECHNICAL FIELD

This disclosure relates generally to optical communications and more particularly to methods for mitigating fiber nonlinearity using strong mode coupling and large modal delay.

BACKGROUND

The networked and mobile computing environment that defines much of contemporary society has provided innumerable convenience and productivity benefits. Given such benefits—society have become increasingly dependent upon services delivered thereon. Perhaps unknown to many, underlying these services are vast optical networks transporting incalculable volumes of data.

As society's communications data requirements continue to unabatedly increase, there exists a compelling need to increase the data speed and reliability of optical communication. Given the utility, importance, and necessity of optical communications and networks constructed therefrom, systems, methods, and structures that enhance their data carrying capabilities would represent a welcome addition to the art.

SUMMARY

An advance in the art is made according to aspects of the present disclosure directed to systems, methods, and structures for mitigating optical fiber nonlinearity by employing strong mode coupling and large modal delay. In sharp contrast to the prior art teachings, systems, methods and structures according to at least one aspect of the present disclosure employ fiber(s) that has a large amount of PMD (large DGD). When so provided, the DGD should be large enough that any average spreading amount due to DGD should be comparable (substantially equal) to the amount spreading caused by CD.

Viewed from a first aspect, the present disclosure is directed to a method for reducing impairments arising from fiber nonlinearity comprising: providing a fiber exhibiting a large differential group delay (DGD); and adjusting the DGD such that the DGD is sufficiently large that any average spreading from the DGD is comparable to spreading resulting from chromatic dispersion (CD).

Viewed from another aspect, the present disclosure is directed to a method for reducing impairments arising from fiber nonlinearity comprising: providing a fiber having multiple cores that are strongly coupled such that signals carried in the multiple cores mix frequently and continuously; wherein the length at which the signals carried in the multiple cores is less than the length at which any impairments from fiber nonlinearities become noticeable; wherein a group velocity in the individual, multiple cores are different.

Viewed from yet another aspect, the present disclosure is directed to a method for increasing transmission density of a system having coupled-core, multi-core fibers (CC-MCF) comprising: providing the CC-MCF fiber having a large mode group delay (MGD), wherein group velocity in individual cores of the multi-core fiber are different from one another; reducing core sizes of the individual cores while maintaining strong coupling between them such that signals carried in the multiple cores mix frequently and continuously while maintaining different group velocities in each core.

Viewed from still another aspect, the present disclosure is directed to an optical fiber exhibiting reduced impairment from nonlinearity, said optical fiber characterized by: a large differential group delay (DGD) that is sufficiently large that any average spreading due to the DGD is substantially the same as any spreading resulting from chromatic dispersion (CD).

Finally, the present disclosure is additionally directed to optical fiber(s) exhibiting reduced impairment from nonlinearity and other impairments that support the methods disclosed herein.

BRIEF DESCRIPTION OF THE DRAWING

A more complete understanding of the present disclosure may be realized by reference to the accompanying drawing in which:

FIG. 2(A) and FIG. 2(B) are graphs depicting large PMD fiber simulation results for: FIG. 2(A), Q vs. channel power for different levels of DGD, for fibers with three different dispersion parameters namely, 21 ps/nm/km (square), 5 ps/nm/km (diamond), and 80 ps/nm/km (stars) wherein DGD is units of ps; and FIG. 2(B), maximum Q vs. DGD for three different dispersions values where dashed lines show the maximum Q for MGD=0, according to aspects of the present disclosure;

FIG. 3(A) and FIG. 3(B) are plots showing the comparison of CC-MCF to large PMD fiber for: FIG. 3(A), Q vs. channel power with both MGD=DGD=0, and for three different dispersion parameters, 21 ps/nm/km, 5 ps/nm/km, 80 ps/nm/km, and FIG. 3(B), maximum Q vs. MGD for three different dispersion values wherein dashed lines show the maximum Q for MGD=0, according to aspects of the present disclosure;

Figure 1:
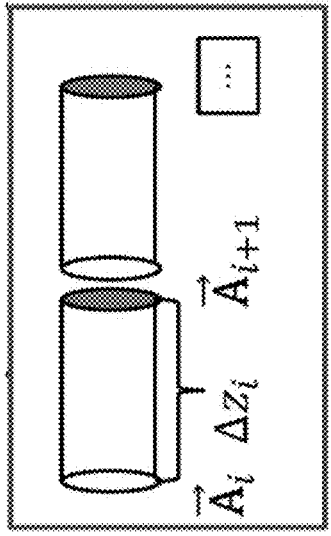
FIG. 1 schematically illustrates the solution of the Manakov equation (ME) using split step Fourier Transform Method (SSFT) where mode coupling and modal delay are induced at each step according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Recently, spatial division multiplexing has attracted a great deal of attention to improve optical transmission systems in a number of ways. One illustrative example involves using non-standard fibers with respect to their spatial modal properties such that they mitigate fiber nonlinear impairments at the expense of inducing linear impairments in the form of mode coupling, which is an easier problem to solve by using contemporary, coherent digital signal processing (DSP) techniques.

For instance, a quasi-single-mode transmission scheme has been proposed to increase fiber effective area beyond the single-mode cut-off and mitigate any resulting multi-path interference using DSP. A similar trade-off has been noted with coupled-core multi-core fibers (CC-MCF). Those skilled in the art will appreciate that while Kerr nonlinearity effectively reduces with increasing number of strongly coupled cores, it nevertheless requires larger a MIMO equalizer. Moreover, in both of these illustrative examples, the degree of mitigation can be increased as long as resources for DSP become more available. This provides a clear pathway to sustained improvement in transmission capacity as the DSP resources and capabilities continue to grow.

In this disclosure, we describe and simulate two illustrative scenarios in which such a tradeoff between nonlinearity mitigation and linear equalization can be established. First, a scenario including a single-mode, single-core fiber with large polarization mode dispersion (LPMD) is described. Advantageously, such fibers would be compatible with existing transmission systems, however, they would require extremely high DSP resources. A second scenario wherein a CC-MCF with two strongly coupled single-mode cores, where the required DSP resources can be less is disclosed. With such a configuration, significant changes in the transmission systems would be necessary, such as fan-in fan-out devices, etc.

Modeling Strong Mode Coupling and Modal Delay in LPMD Fiber, and CC-MCF

As we shall show and describe, both of these scenarios are modeled using a standard, coarse step method that is oftentimes used to simulate fiber nonlinearity in the presence of polarization mode dispersion (PMD). More specifically, optical fiber is modeled as a concatenation of multiple uniform sections, wherein modes propagate independently with a fixed modal delay between them and between each section, the modes are rotated randomly.

In the case involving PMD, the two modes represent the polarization modes, and in the case of CC-MCF, the two modes represent the two cores. A more general case of CC-MCF with polarization mode dispersion in each core is not modeled. Therefore, in each uniform section, the modal delay between polarization modes of each core is neglected, however, between the sections, a 4×4 random unitary matrix is used which would cause strong coupling between all four modes of the two cores including polarization modes.

As depicted in FIG. 1, the Manakov equation (ME) is solved using split step Fourier Transform method (SSFT), where mode coupling and modal delay are induced at each step, where $\vec{A}_i=[A_{1x} \ A_{1y} \ A_{2x} \ A_{2y}]^T$ is the optical field propagating in the two cores with two polarization modes in the case of CC-MCF, and $\vec{A}_i=[A_{1x} \ A_{1y}]^T$ in the case of LPMD fiber, at the end of the $i^{th}$ step. $\hat{N}_i$ is the nonlinear operator at the $i^{th}$ step, with $P_k^i=|A_{kx}|^2+|A_{ky}|^2$, n=1, 2 corresponds to single core LPMD, and 2 core CC-MCF respectively, $\gamma$ is the nonlinearity parameter, $\Delta z$ is the step size, $I_{n \times n}$ is the n by n identity matrix. $\mathbb{D}_i(\omega)$ is the dispersion operator, where $\beta_2$ is the dispersion parameter which is assumed to be the same for both cores in the CC-MCF.

$M_i$ is either a 2×2, or a 4×4 random unitary matrix that would uniformly mix the two polarization modes of the LPMD fiber, or the two polarization modes of both cores of the CC-MCF. $\mathbb{T}_i(\omega)$ is the modal delay operator with $\beta_1^i$ defined as either the difference between the group delay between the polarization modes in the case of LPMD fiber, or the difference between the group delays of two cores in the case of the CC-MCF.

To avoid spurious peaks from artificial periodicity, $\beta_1^i$ is implemented as a random variable fluctuating around a mean value of $\langle \beta_1^i \rangle$ with a standard deviation equal to the 20% of the mean value. The mean modal group delay (MGD) which results from the modal delay between the coupled cores, and the differential group delay (DGD) in the case of LPMD is related to both $\langle \beta_1^i \rangle$ and the number of total steps in the link as $$\text{MGD}=\langle \beta_1^i \rangle 2\sqrt{L\Delta z}=\langle \beta_1^i \rangle \Delta z 2\sqrt{N} \ \ \text{DGD}=\langle \beta_1^i \rangle 2\sqrt{L\Delta z} \quad (1)$$

where, L is the total length of the span, and N is the total number of steps.

To see the impact of modal coupling, and modal delay on nonlinearity, transmission of a single channel dual-polarization 64QAM channel with 43 GHz baud-rate is simulated over a link with 10 spans. The link parameters are as follows; span length is 100 km, fiber attenuation is 0.2 dB/km, nonlinearity parameter is 1.16 $W^{-1}$ $km^{-1}$, amplifier noise figure is 5 dB. Fiber chromatic dispersion (CD) is changed from 5 to 21 and even extended unrealistically to 80 ps/nm-km to see the impact of modal delay in the presence of different amounts of dispersion.

In the case of CC-MCF all the fiber parameters are assumed to be identical for both cores. Simulation window is fixed at $2^{12}$ symbols in time domain, and 4 times the channel baud-rate in the frequency domain. Because the purpose of the simulation is to see how the fiber design affect the nonlinearity, the DSP is kept at a minimum at the receiver side. All the transmission matrices used in the forward propagation are saved, and they are used to completely compensate the modal coupling, and delay. Q factor obtained from bit error counting is used to assess the signal degradation.

Simulation Results and Discussion

Figure 2A:
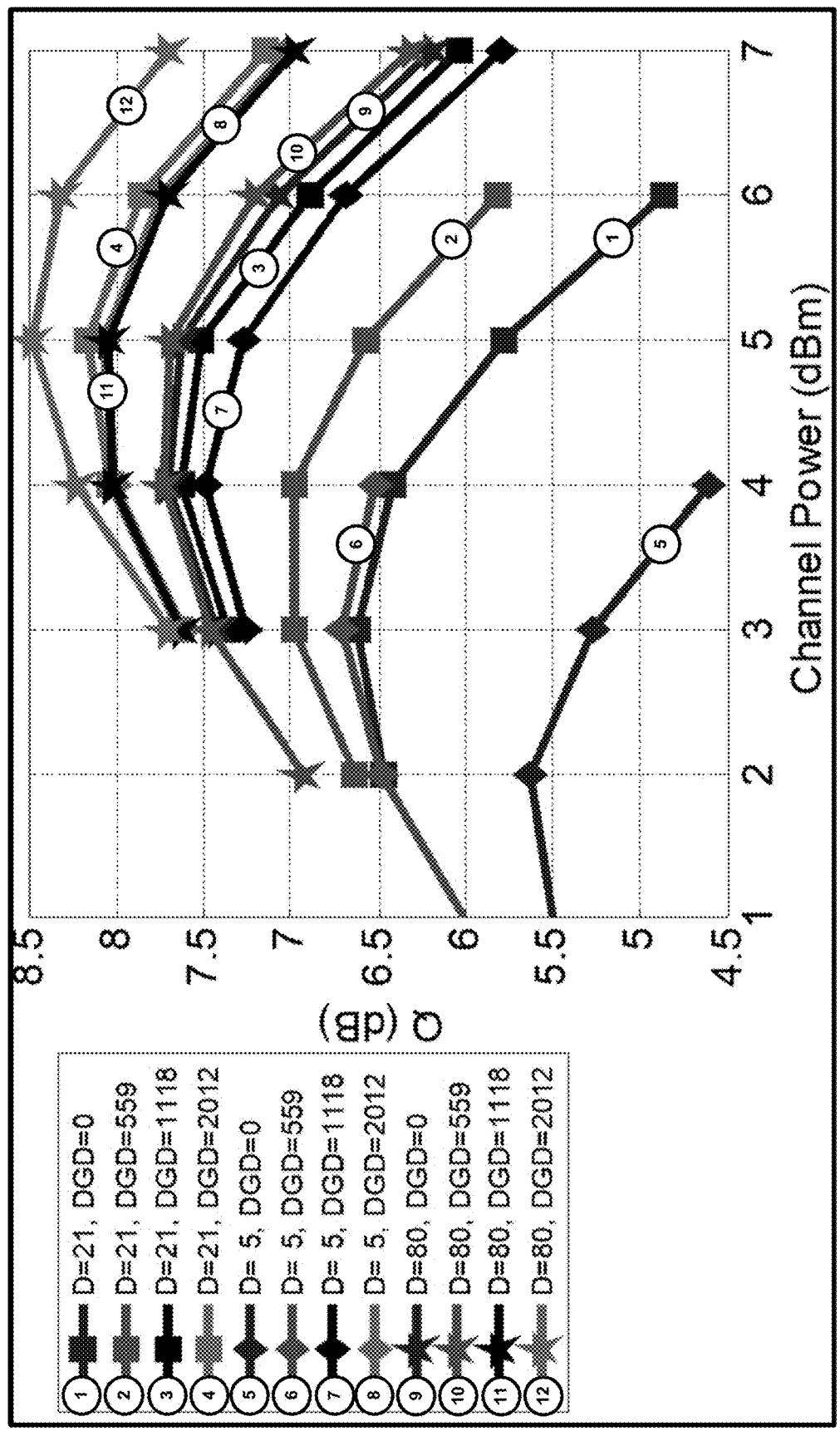

First, the LPMD fiber is simulated. Turning now to FIG. 2(A), there is illustrated a plot that shows the Q factor as a function of channel power for varying fiber CD and DGD. As may be observed, the Q value increases with increasing CD and DGD—due to a reduced nonlinear penalty.

Figure 2B:
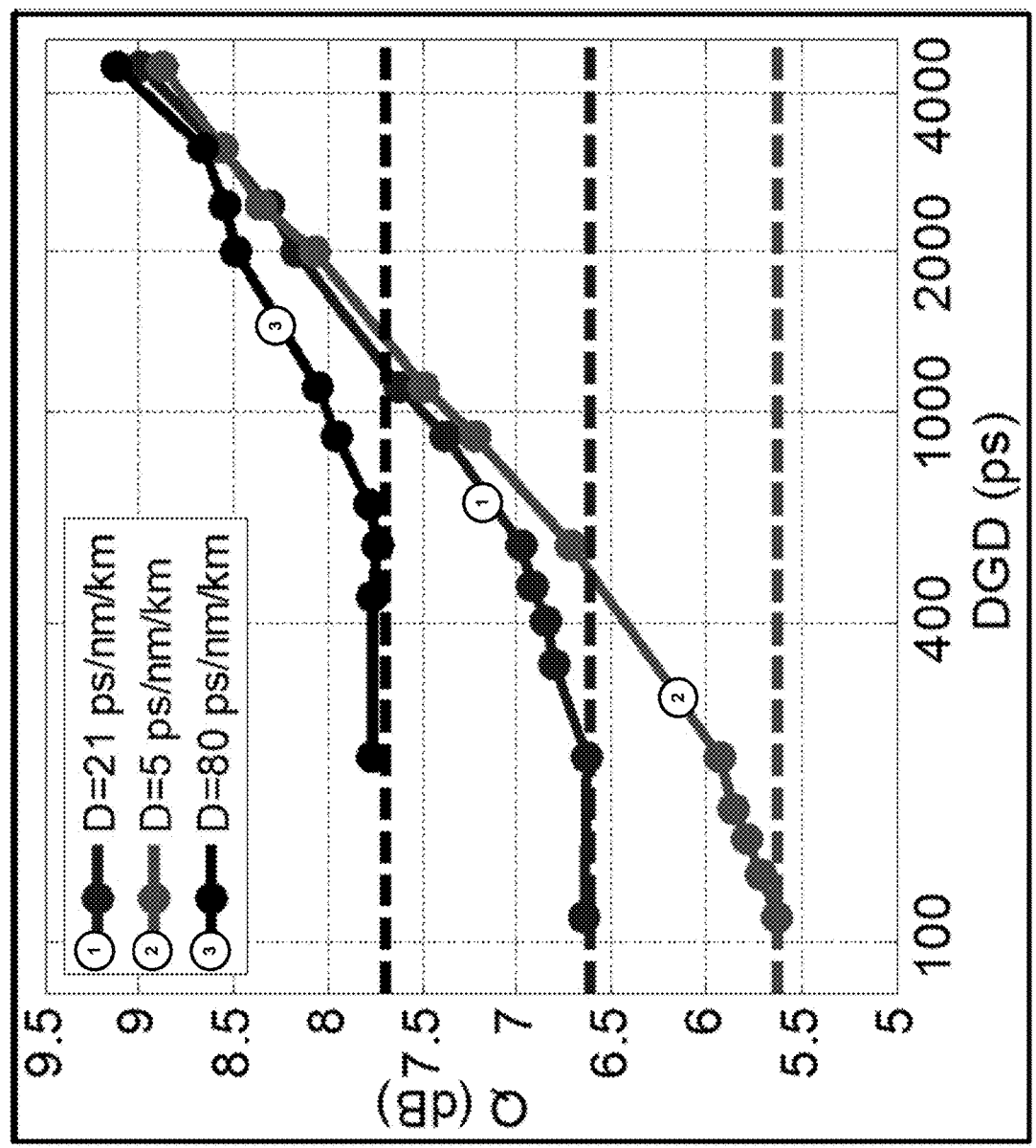

With reference now to FIG. 2(B), there is illustrated a plot that shows how the maximum Q changes with increasing DGD, where the dashed lines show the maximum Q value without PMD. As may be observed, DGD at low levels is effective only when CD is low. As may be understood by those skilled in the art—for single-core systems—there is no advantage to replacing CD with DGD since DGD would require adaptive equalization as opposed to CD.

On the other hand, it is difficult to increase CD beyond a certain level, e.g., (~20 ps/nm-km), which is limited by material dispersion of fiber. In this case, increasing DGD may be a way to mitigate nonlinearity if it can be effectively equalized with DSP. Also shown in FIG. 2(B) is that—at large DGD—nonlinearity mitigation is dominated by DGD, and Q factor converges no matter what the CD is.

Figure 3A:
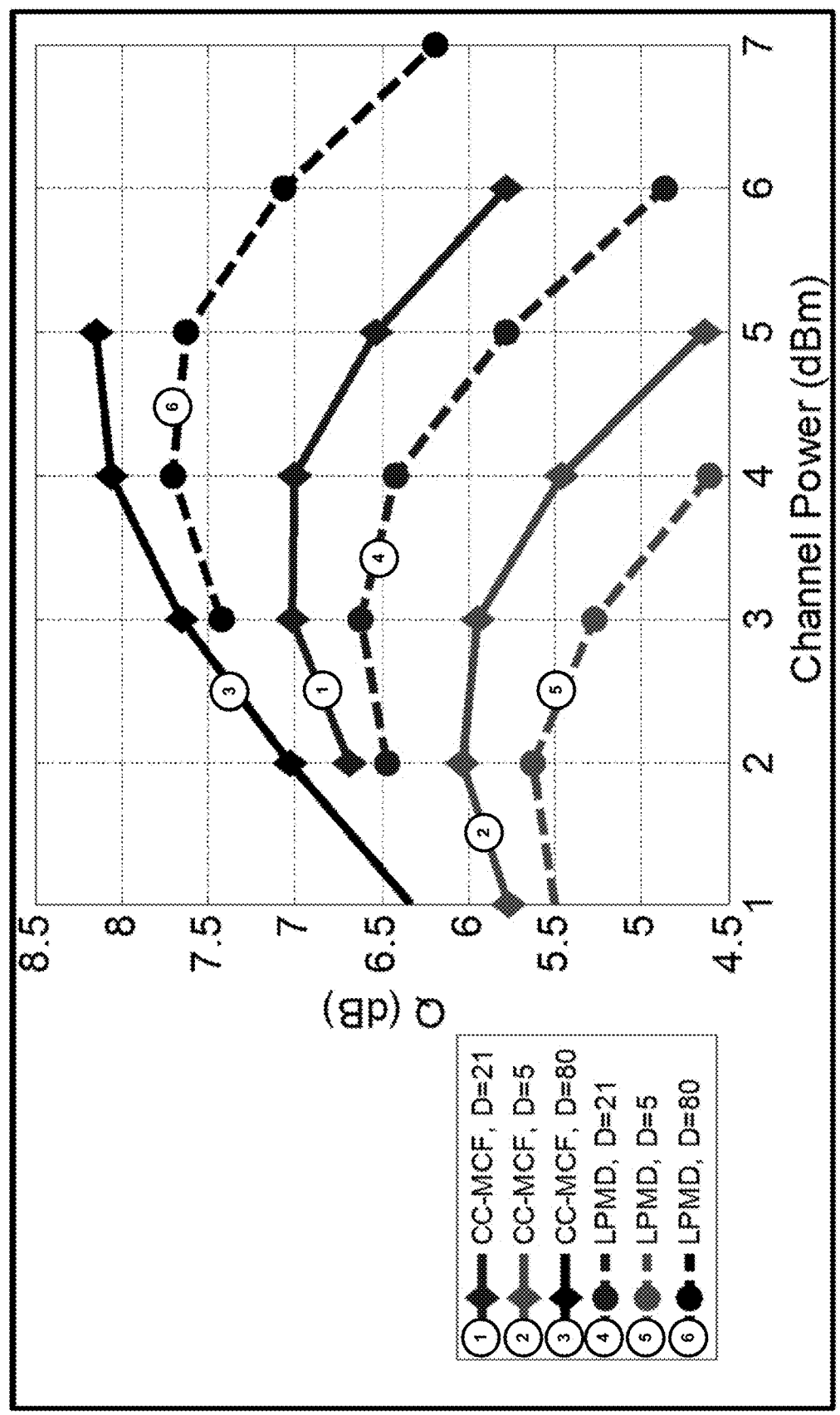
Figure 3B:
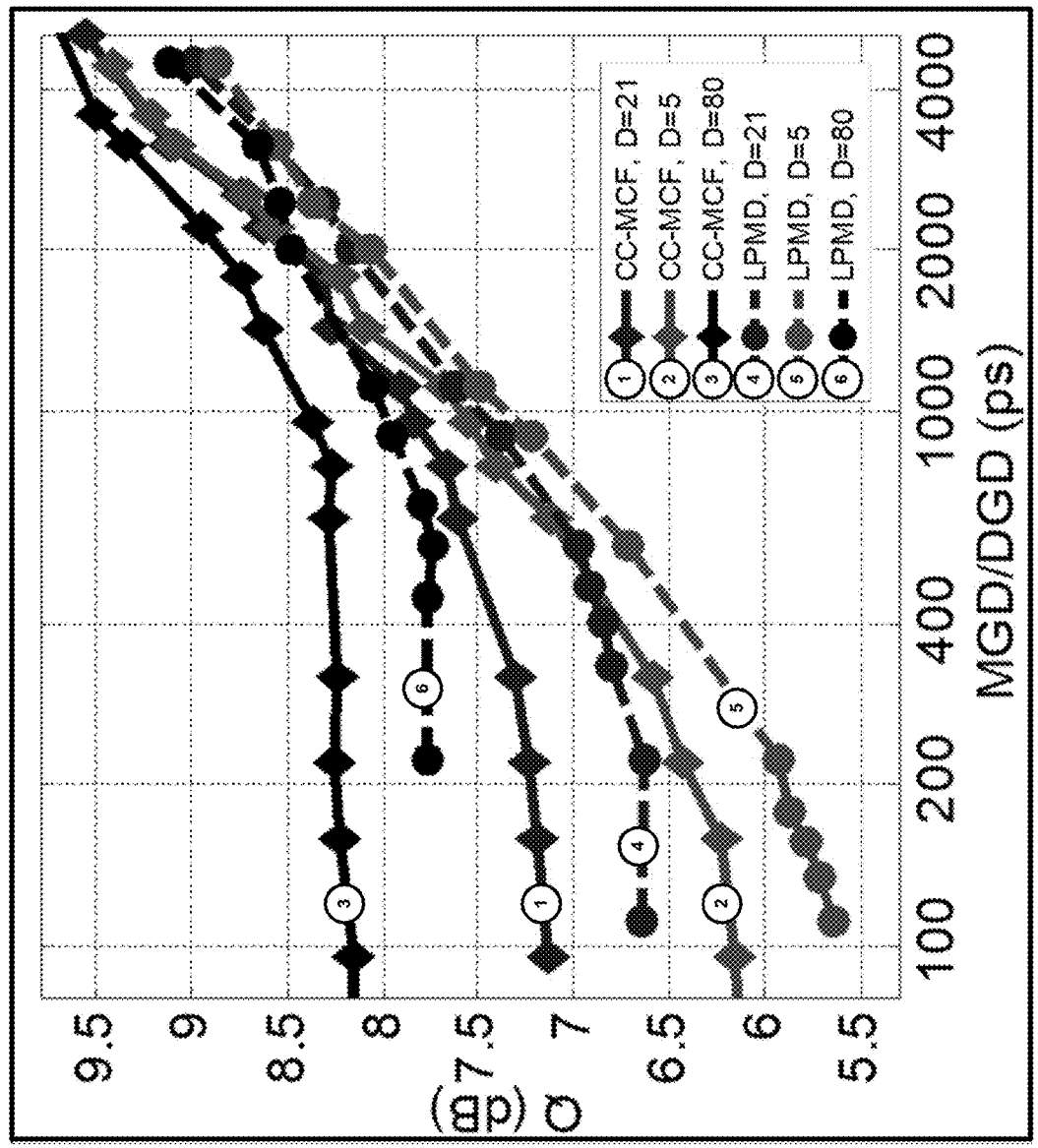

Simulations are repeated for two core CC-MCF, and the results are compared with the LPMD fiber in FIG. 3(A), and FIG. 3(B). As may be observed from FIG. 3(A), Q vs channel power is plotted for both fibers, with three difference CD values, and without any modal delay. Note that in the case of LPMD, DGD=0 corresponds to standard single-mode fiber. In the case of CC-MCF, there is a clear advantage in terms of nonlinearity. Because ME is solved independently for the two cores, and their effective area is assumed to be the same, this mitigation of nonlinearity originates purely from the strong coupling between the cores. This mitigation remains regardless of CD.

With reference to FIG. 3(B), maximum Q is plotted as a function of MGD, and compared to the LPMD. Like the case of LPMD, large MGD helps to mitigate nonlinearity even further.

Note that when using fibers with larger CD, a larger MGD is required to see this additional benefit. Like the case of LPMD—at larger MGD—Q improvement is dominated by MGD rather than CD, and all the curves converge at the high MGD limit. Interestingly, the difference between CC-MCF and LPMD remains even at the largest DGD and MGD values simulated.

Those skilled in the art will appreciate that—in terms of reducing nonlinear impairments—CC-MCF has an advantage since it does not require large MGD to obtain Q improvement. For instance, in the simulated case shown in FIG. 3(B), the LPMD requires close to 1000 ps DGD in order to have similar Q improvement as CC-MCF without MDG. On the other hand, LPMD would be compatible with existing single-mode single-core transmission systems architecture.

At this point we note that when a large MDG/DGD is desired, it would be easier to obtain a larger MGD using CC-MCF than obtaining large DGD with a single-core fiber. Conversely, it may not be easy to obtain very low MGD in the case of CC-MCF.

Those skilled in the art will know and understand that our disclosure may be foundational for a method for reducing impairments arising from fiber nonlinearity by providing a fiber such that it has large amount of PMD. Those skilled in the art will know and appreciate that oftentimes, such fiber exhibiting a large amount of PMD is referred to as a fiber having large DGD. When so provided, the DGD should be large enough that any average spreading amount due to DGD should be comparable (substantially equal) to the amount spreading caused by CD.

Surprisingly, those skilled in the art have not realized the benefit of DGD for fibers exhibiting a large dispersion—which are the state of the art fibers—perhaps because the unintentional DGD that naturally occurs in typical fibers is small, and such a small level of DGD does not show any specific beneficial effect. In sharp contrast to such state-of-the-art knowledge, we now disclose and claim that, the fiber should be designed/provided/configured to intentionally have large levels of DGD so that it can suppress nonlinear penalty. Note that while DGD is a random process it is more difficult to equalize as compared to CD, however, it is easier to deal with then impairments caused by fiber nonlinearity. Note further that while it is preferable to increase the fiber CD to reduce fiber nonlinearity impairments, however it is difficult to increase CD. Fortunately, and according to the present disclosure—it is easier to increase DGD.

Still according to the present disclosure is another method for reducing impairments arising from fiber nonlinearity achieved by design/providing/configuring a fiber so that it has multiple cores, and these multiple cores are strongly coupled. Those skilled in the art will know and understand that strongly coupled as that term is used herein means that any signals carried in these multiple cores mix frequently and continuously. The length scale (overall distance) at which these two signals completely mix up should be much smaller than the length scale (distance) at which impairments from fiber nonlinearity start to become noticeable. Such fibers are called coupled-core fibers CC-MCF. We note that the larger the number of coupled cores the better it is for nonlinearity.

In addition to having multiple, coupled cores, the fiber should be designed/provided/configured so that the group velocity(ies) in the individual cores are different. This difference results in a so-called mode group delay (MGD).

Having large MGD further reduces the nonlinear impairments. While the prior art has noticed that there is suppression of nonlinearity without MGD—notwithstanding the prior art tried to reduce MGD as much as possible. Similar to above, those skilled in the art fail to see the benefits of MGD as now disclosed, taught, and described. Accordingly, and in sharp contrast to contemporary thought, we increase MGD and when it is increased sufficiently, then the benefits of having large MGD are noticeable.

Finally, our disclosure herein serves as a foundation for a method for increasing transmission density using CC-MCF with large MGD wherein transmission density is defined as the amount of data transmission that is achieved in a given area. Such an area could be the cross section of an optical cable comprising multiple fibers, or a single strand of optical fiber with multiple cores in it.

Those skilled in the art will know and appreciate that optical signals travels inside the core(s) of a fiber. Generally, such core(s) cannot be too small. We note that one problem encountered when one reduces the diameter of a core is that a signal traversing that core begins to experience too much nonlinear impairment, and the data capacity drops sharply, which reduces the transmission density. Accordingly, a limit of the transmission density is reached. Yet another problem experienced when reducing the core diameter is that, when the core diameter is reduced CD also reduces. As shown in FIG. 2(A) and FIG. 3(A), when CD is reduced, signal quality Q reduces because of larger nonlinear impairment.

Accordingly, we now disclose a method for increasing transmission density by using CC-MCF with large MGD. In this case, we reduce the core size while keeping the core size(s) close enough such that they are strongly coupled, and also that they have widely differing group velocities in each core. In this case, because the MGD is large, the level of CD does not matter anymore. As one can observe in FIG. 3(B), as the level of MGD increases (a lot), even the fibers with small CD will exhibit a signal quality as good as fibers with large CD. Finally, note that a larger MGD itself can reduce the nonlinear penalty.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for reducing impairments arising from fiber nonlinearity comprising:
   providing a fiber exhibiting a large differential group delay (DGD);
   adjusting the DGD such that the DGD is sufficiently large that any average spreading from the DGD is substantially equal to spreading resulting from chromatic dispersion (CD).

2. A method for reducing impairments arising from fiber nonlinearity comprising:
   providing a fiber having multiple cores that are strongly coupled such that signals carried in the multiple cores mix frequently and continuously;
   wherein the length at which the signals carried in the multiple cores is less than the length at which any impairments from fiber nonlinearities become noticeable;
   wherein a group velocity in the individual, multiple cores are different, such that an increased mode group delay (MGD) results.

* * * * *